Sept. 22, 1931.  H. C. LORD  1,824,090

GEAR SHIFT LEVER MECHANISM

Filed Dec. 10, 1927

INVENTOR.
Hugh C. Lord

Patented Sept. 22, 1931

1,824,090

UNITED STATES PATENT OFFICE

HUGH C. LORD, OF ERIE, PENNSYLVANIA

GEAR SHIFT LEVER MECHANISM

Application filed December 10, 1927. Serial No. 239,094.

The present invention is designed particularly to improve the manner of mounting the shift lever yielding under the fulcrum thrust of the lever, such as used in automobiles, on the gear box. In carrying out my invention in its preferred form I utilize rubber as the fulcrum joint, the rubber yielding to permit the various movements of the shift lever. The rubber under these circumstances also operates as a seal to thoroughly close the gear box and prevent any disagreeable leakage of oil through the gear box at the opening receiving the shift lever. In addition to this the yielding fulcrum for the shift lever cushions the blow with which the gears are thrown together with a quick follow-up when the gears come into register which improves the operation of the device. Features and details of the invention will appear from the specification and claims.

A preferred embodiment of the invention is illustrated in the accompanying drawings as follows:—

Figure 1:
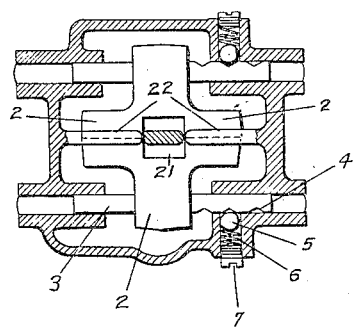
Figure 2:
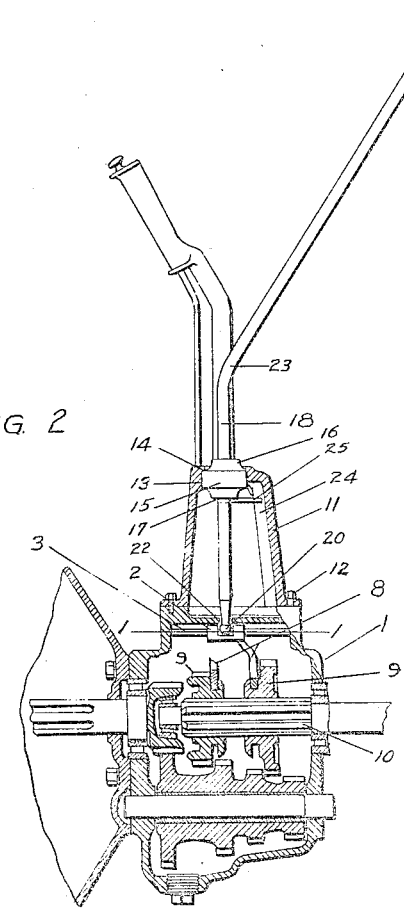

Fig. 1 shows a plan view of the gear shift mechanism on the line 1—1 in Fig. 2.

Fig. 2 a vertical section of a gear box with the shift lever in place.

Figure 3:
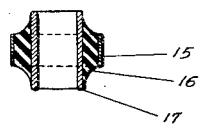

Fig. 3 a section of the rubber joint.

Figure 4:
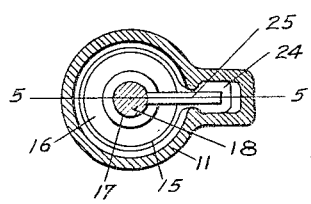
Figure 5:
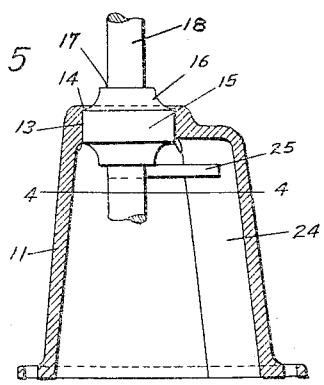

Fig. 4 a section on the line 4—4 in Fig. 5.

Fig. 5 a section on the line 5—5 in Fig. 4.

1 marks the gear box and 2 the shift plates. These are mounted on rods 3. The rods have the usual notches 4 yieldingly engaged by balls 5. The balls 5 are pressed into engagement by springs 6 which may be adjusted by screws 7. Arms 8 extend from the shift plates 2 to the various gears as 9 in the gear box, these gears being mounted on a shaft 10 in the usual manner, one of the arms 8 extending to one plate and the other arm to the opposite plate.

A cover plate 11 is of dome shape secured to the gear box by screws 12. An opening 13 extends through the top of the cover and is provided with a slight flange 14 at its upper edge. A shell 15 of a joint is pressed into the opening 13 against the shoulder. Rubber 16 bridges the space between the shell 15 and a sleeve 17. Preferably the rubber is secured to the shell and sleeve by surface bonding.

A shift lever 18 extends through the sleeve 17 with a pressed fit and is provided with a handle 19 at its upper end in the usual manner and with a cylindrical working end 20 which extends into slots 21 in the shift plates 2. Fingers 22 lock the shift lever against movement when the shift lever is in neutral, these parts operating in their usual way.

The shift lever has a rearward bend at 23 and this gives the lever when it is operated a tendency to turn on the axis of the joint. It is desirable to lock this and I therefore provide a slot 24 in the wall of the cover plate 11 and a pin 25 extends from the shift lever into this slot. This pin has sufficient clearance to permit the lever to be swung crosswise to engage with either shift lever and forward and back in either position to shift the gears.

With this structure there is a perfect seal of the gear box, a convenient mounting of the lever, and a cushioning of the shock when the gears are moved into engagement.

What I claim as new is:—

1. In a gear shift lever mechanism, the combination of a gear box, a shift lever, and a resilient rubber fulcrum for the lever sustaining the fulcrum thrust of the lever in any of its several directions of movement.

2. In a gear shift lever mechanism, the combination of a gear box, a shift lever, and a resilient rubber fulcrum for the lever in the form of a rubber diaphragm sustaining the fulcrum thrust of the lever in any of its several directions of movement.

3. In a gear shift lever mechanism, the combination of a gear box having a shift lever opening therein; a shift lever extending through the opening; and a resilient rubber fulcrum for the lever in the form of a rubber diaphragm in the opening, said diaphragm sealing the box, and sustaining the fulcrum thrust of the lever.

4. In a gear shift lever mechanism, the combination of a gear box, a shift lever, and a resilient rubber diaphragm through which the lever extends sealing the box, and forming a fulcrum for the lever, said diaphragm being connected by surface bonding with the box and lever.

5. In a gear shift lever mechanism, the combination of a gear box, a shift lever, and a resilient rubber diaphragm through which the lever extends, said diaphragm being connected by surface bonding with the box and lever and forming a fulcrum for the lever sustaining the fulcrum thrust of the lever in any of its several directions of movement.

6. In a gear shift lever mechanism, the combination of a gear box, a shift lever, and a resilient rubber fulcrum for the lever accommodating the movement of the lever through the distortion of the rubber, in any of its several directions of movement.

7. In a gear shift lever mechanism, the combination of a gear box having a shift lever opening therein, a shift lever, and a resilient rubber fulcrum for the lever in the opening and sustaining the fulcrum thrust of the lever, said rubber fulcrum sealing the opening in the box.

8. In a gear shaft lever mechanism, the combination of a gear box, a shift lever and a resilient rubber fulcrum for the lever yielding under the fulcrum thrust of the lever in any of its several directions of movement.

9. In a gear shift lever mechanism, the combination of a gear box having a shift lever opening therein; a shift lever; and a yielding rubber fulcrum for the lever sealing the opening in the box, said rubber fulcrum yielding under the fulcrum thrust of the lever.

10. In a gear shift lever mechanism, the combination of a gear box, a shift lever, a resilient rubber diaphragm through which the lever extends, said diaphragm being connected by surface bonding with the box and lever and forming a yielding fulcrum for the lever yielding under the fulcrum thrust of the lever in any of its several directions of movement.

11. The combination of a gear box, a gear shift device therein, a shift lever mechanism comprising a shift lever operating on the device, and a resilient rubber mounting for the lever whereby the thrust of the lever in any of its directions of movement will be cushioned with relation to said device and vibrations therein will be dampened.

In testimony whereof I have hereunto set my hand.

HUGH C. LORD.